United States Patent

Dunn et al.

[11] 4,197,489
[45] Apr. 8, 1980

[54] SPINDLE DRIVE SYSTEM

[75] Inventors: David S. Dunn, Windham, N.H.; Fernando M. Vasconselos, Lowell, Mass.

[73] Assignee: MFE Corporation, Salem, N.H.

[21] Appl. No.: 872,930

[22] Filed: Jan. 27, 1978

[51] Int. Cl.² ............................................. H02P 7/28
[52] U.S. Cl. .................................. 318/138; 318/313; 318/254; 310/67 R
[58] Field of Search ............... 318/138, 254, 313, 640, 318/326, 327; 310/67 R

[56] References Cited

U.S. PATENT DOCUMENTS

| | | | |
|---|---|---|---|
| 2,829,287 | 4/1958 | Font | 310/67 R |
| 3,231,807 | 1/1966 | Willis | 318/313 |
| 3,367,407 | 1/1968 | Hill | 318/138 |
| 3,418,550 | 12/1968 | Kolatorwicz et al. | 318/138 |
| 3,581,173 | 5/1971 | Hood | 318/138 |
| 3,708,681 | 1/1973 | Ivers | 318/640 |
| 3,743,906 | 7/1973 | Torok | 318/254 |
| 3,805,134 | 4/1974 | Osamu et al. | 318/138 |
| 3,863,118 | 1/1975 | Lander et al. | 318/254 |
| 3,919,572 | 11/1975 | Desy | 310/67 R |
| 4,042,863 | 8/1977 | von der Heide | 318/254 |

*Primary Examiner*—David Smith, Jr.
*Attorney, Agent, or Firm*—Cesari and McKenna

[57] ABSTRACT

A floppy disk drive system employs an inside-out DC motor whose centrally located stator is mounted directly to the chassis. The motor has a tubular rotor that encircles the stator and it is supported co-axially with the stator by the rotary disk drive spindle. A timing and commutation disk is mounted directly on the rotor and, together with speed control and commutation networks, maintains uniform motor speed.

5 Claims, 13 Drawing Figures

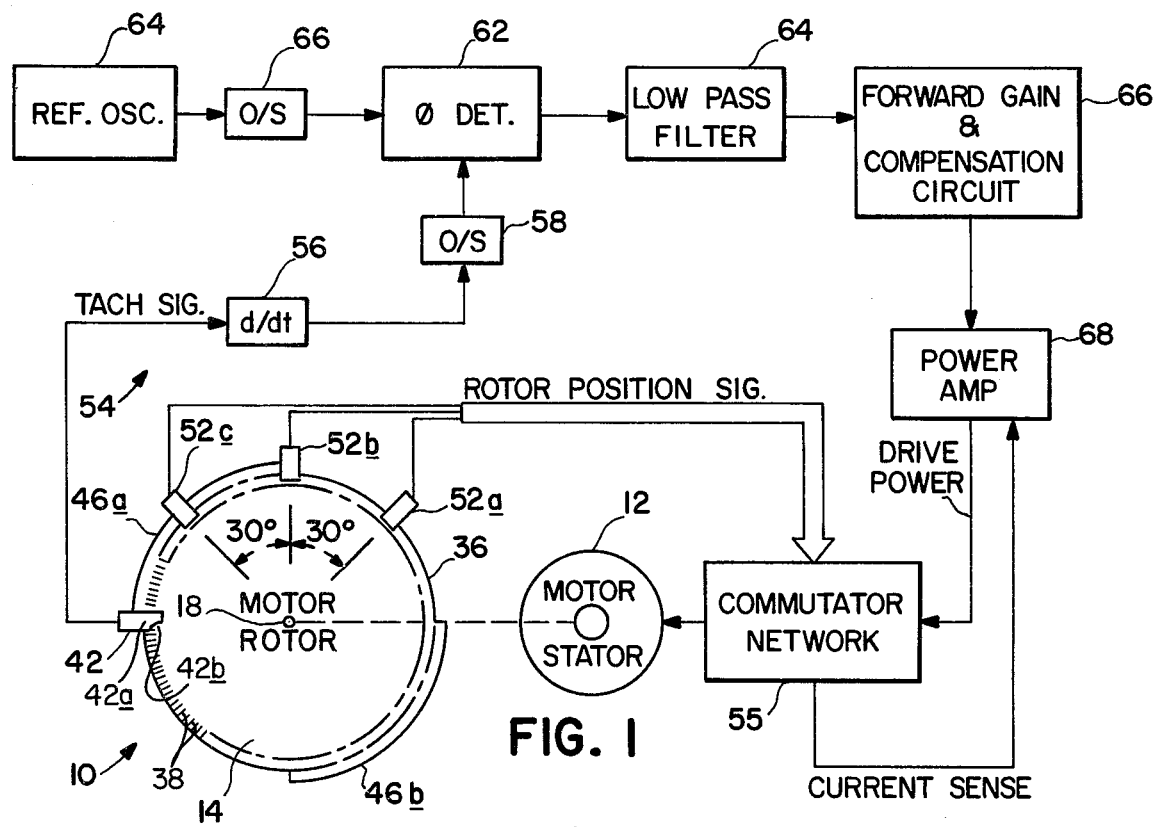
FIG. 1
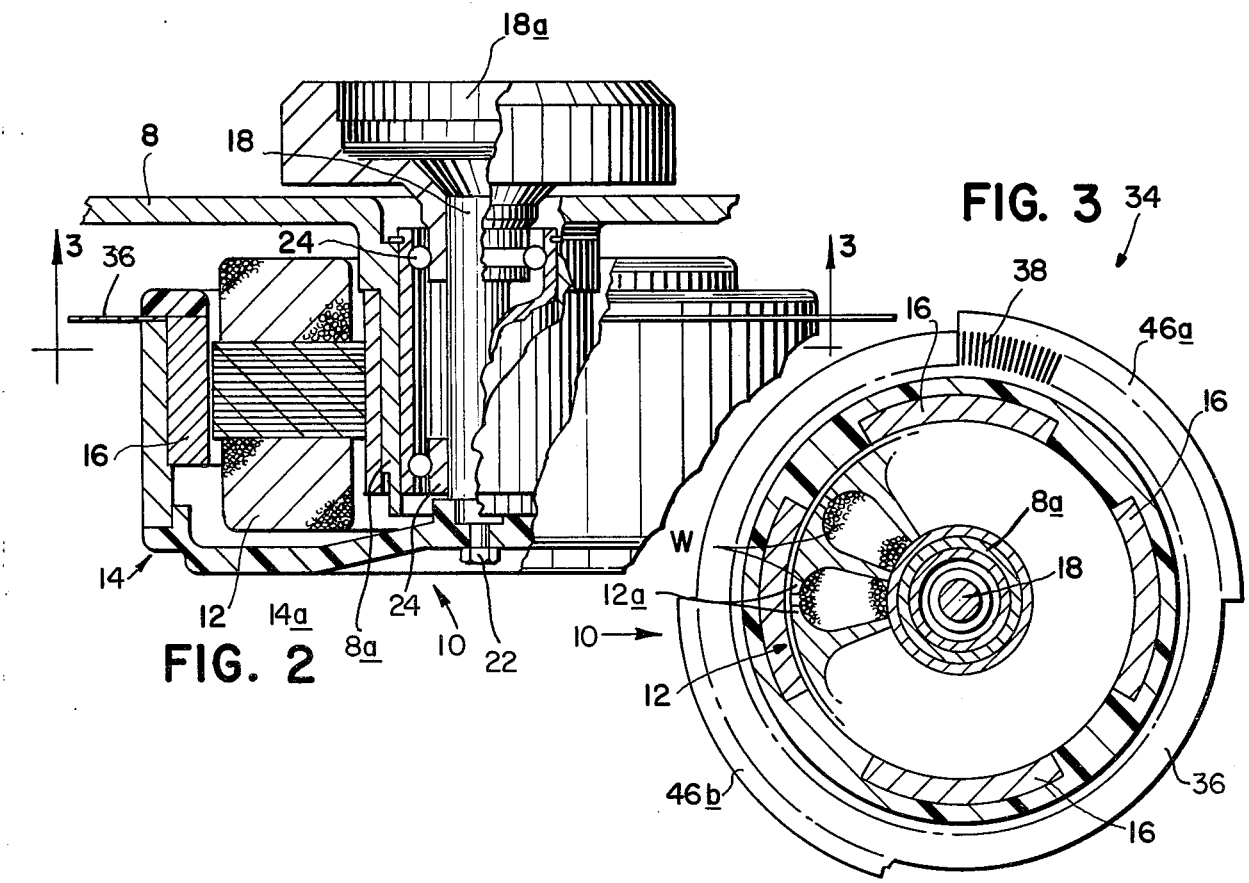
FIG. 2
FIG. 3

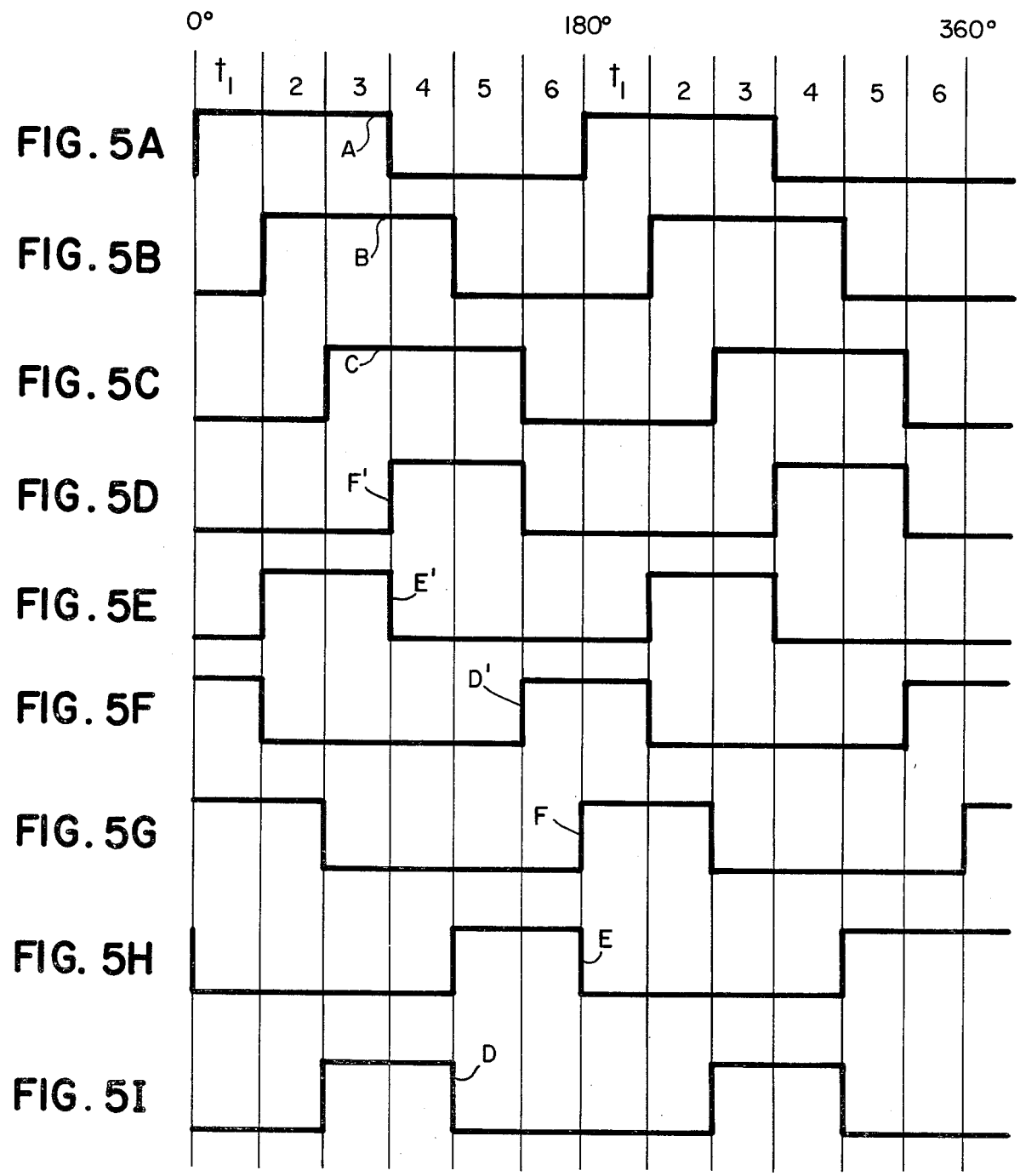

SPINDLE DRIVE SYSTEM

This invention relates to a spindle drive system. It relates more particularly to an improved motor and servo system for rotating the spindle that turns a floppy disk.

BACKGROUND OF THE INVENTION

There are three basic types of spindle drives employed in most present day disk drive systems. Some drives have an AC synchronous motor coupled to the spindle by means of a belt and pulleys. This utilization of AC power to drive the motor makes the motor speed dependent on the source frequency. Consequently, if it is desired to operate the drive on various frequency sources, different pulley ratios must be employed to maintain a given speed. Also, these pulley type drives tend to be relatively complex and expensive. Also they are relatively inefficient and are generally characterized by excessive power consumption. Still further, in order to be economically competitive, that type drive utilizes relatively low cost AC motors and hence they are dependent upon the belt drive system inertia to smooth the torque ripple inherent in such motors since the motors have a limited number of magnetic poles.

In the second type of system, the spindle is driven directly by a conventional DC motor whose speed is controlled by the output of a tachometer connected with the motor in a servo loop. While that arrangement avoids the requirement of belts and pulleys, it has other problems. More particularly, the commmutation or brush noise inherent in such DC motors can prove detrimental to the high performance operation of the overall data recovery system in which the drive is a part. Also that type drive requires frequent maintenance in the form of motor brush replacement. Also, while those direct drive systems avoid the cost of belts and pulleys, they still require a tachometer which is a relatively expensive item and therefore makes the overall system fairly expensive.

The third type spindle drive used in systems of this type employs a servo driven DC motor linked to the spindle by way of a pulley drive. Therefore, it has disadvantages of the above two described systems.

SUMMARY OF THE INVENTION

Accordingly it is an object of the present invention to provide a spindle drive for rotating a recording member which is relatively efficient as compared with prior conventional drives.

A further object of the invention is to provide a spindle drive whose output torque is relatively constant and whose long and short term speed variations are relatively low.

Yet another object is to provide a spindle drive whose speed is independent of its power supply frequency.

A further object of the invention is to provide a spindle drive of this general type which requires relatively little maintenance.

Yet another object is to provide a spindle drive which generates relatively little noise so that it does not interfere with the proper operation of the data recovery system as a whole.

A further object of the invention is to provide a spindle drive system which is relatively inexpensive to make and maintain.

Still another object is to provide a spindle drive which has a long and efficient service life.

Briefly, the spindle drive made in accordance with this invention is a direct drive system in that the spindle is connected directly to the drive motor, avoiding the need for belts and pulleys with their attendant cost and complexity. The motor itself is a bipolar, brushless, three phase DC motor having an "inside-out" design. That is, it has a stationary, centrally located stator that is mounted directly to the machine frame. This gives the motor unusually good stability and also assures that any energy dissipated in the motor as heat is immediately conducted away to the machine frame, thereby improving the service life of the motor. The motor rotor encircles the stator and is suspended from the drive spindle so that it can rely on the spindle bearings to preserve its colinearity with the stator resulting in a further cost saving.

Of course, the fact that the present apparatus utilizes a brushless DC motor instead of an AC motor or a conventional DC motor avoids the disadvantages of excessive power consumption and speed verses frequency dependence inherent in the former prior motor and the problems of brush replacement, noise and cost which are inherent in the latter type prior motor. In fact, the present motor with its inside-out design is highly efficient, typically reaching an efficiency of 60% at 360 rpm.

Low cost is achieved without any sacrifice in the stability or performance of the overall drive system not only because of the direct motor drive, but also because of a unique speed control arrangement employing an etched commutator disk integral with the rotor with optical sensors that derive both speed and absolute position information. That arrangement coupled with simple servo and commutation circuits cooperate to maintain extremely smooth system drive torque, resulting in an instantaneous speed variation as low as 0.4% and a long term variation of less than ±1.5%.

BRIEF DESCRIPTION OF THE DRAWINGS

For a fuller understanding of the nature and objects of the invention, reference should be had to the following detailed description, taken in connection with the accompanying drawings, in which:

FIG. 1 is a block diagram of a disk drive system made in accordance with this invention;

FIG. 2 is an elevational view with parts broken away showing the drive system in greater detail;

FIG. 3 is a sectional view along line 3—3 of FIG. 2;

FIGS. 5A to 5I are diagrammatic views of the waveforms developed by the FIG. 4 sections further illustrating the operation of the present system.

DESCRIPTION OF THE PREFERRED EMBODIMENT

Figure 4:
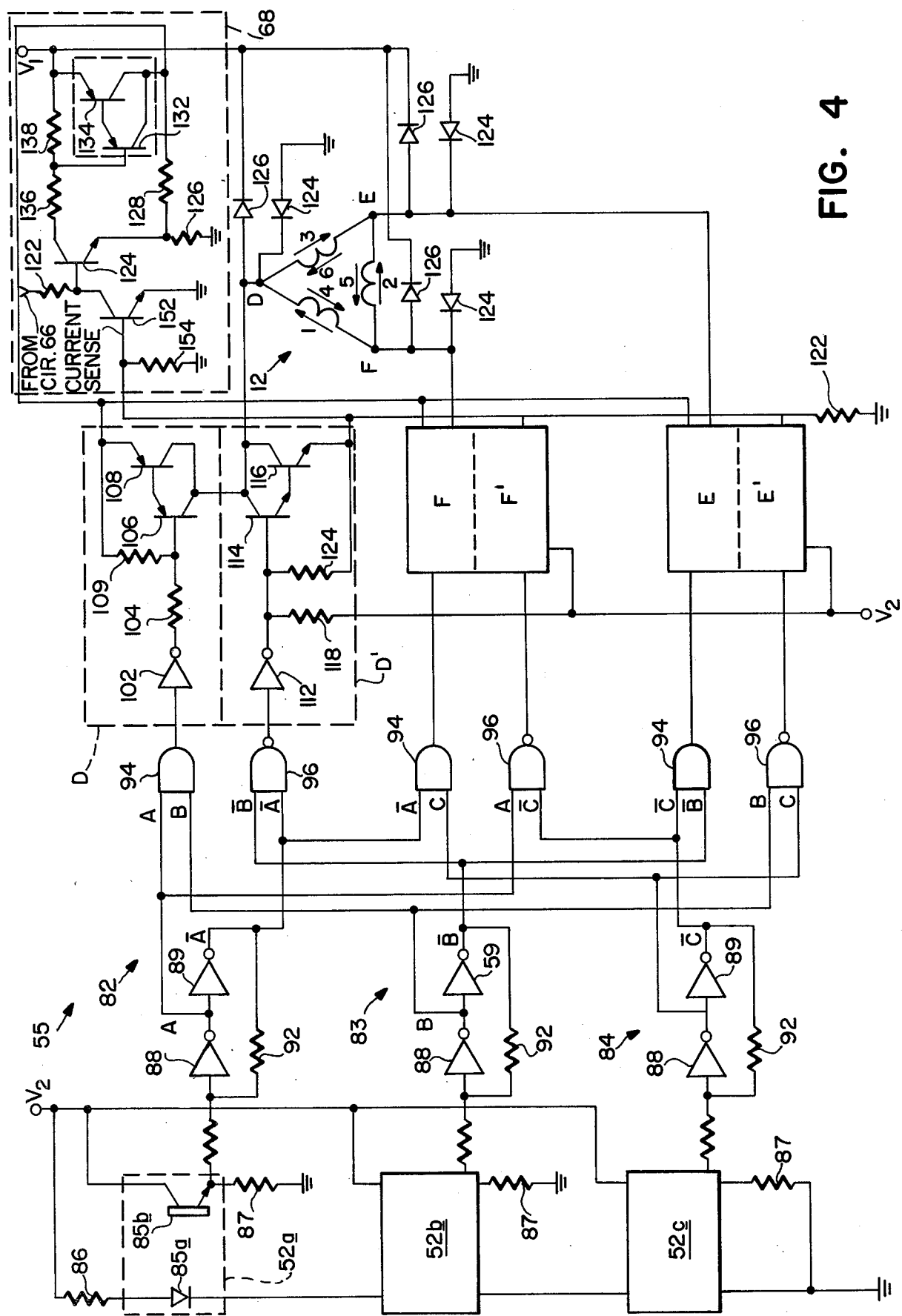
FIG. 4 is a schematic diagram illustrating the electrical sections of the FIG. 1 system in greater detail.

Referring first to FIGS. 2 and 3 of the drawings, the components of the present system are supported on a cast metal chassis 8. The system includes a three phase, four pole, delta wound brushless DC motor indicated generally at 10. As seen from the drawing figure, it has an inside-out design in that it has a centrally located stator 12 composed of a radial array of stator segments 12a encircled by wires W. Stator 12 engages directly around a depending neck 8a formed in chassis 8 so that the chassis functions as a heat sink which promptly conducts heat away from the motor before the heat can adversely affect the stability or life expectancy of the motor.

Rotor 14 is a generally cylindrical cup encircling stator 12. It has four identical arcuate magnet segments 16 distributed evenly around its inner circumference. The lower end of a spindle or shaft 18 is secured to the center of the rotor bottom wall 14a by a set screw 22 or other suitable means. Spindle 18 projects up through neck 8a in chassis 8 and is rotatively supported there by bearings 24 press fit into the opposite ends of neck 8a. Thus in the present design, the rotor 14 and spindle 18 are both rotatively supported by the very same bearings 24 resulting in a considerable cost savings. The upper end of spindle 18 terminates in a hub 18a which is arranged to project into the central opening of a floppy disk (not shown) positioned on chassis 8. Since the spindle is driven directly by the motor there is no need for pulleys and belts further minimizing system cost.

As best seen in FIGS. 1 and 3, a single encoder disk 36 is mounted for rotation with rotor 14. Disk 36 is opaque except for a circular array of transparent slits or apertures 38 distributed around its periphery forming a tachometer track. An optical sensing assembly 42 is positioned adjacent disk 36. Assembly 42 includes a light source 42a such as a LED and a light sensor 42b such as a phototransistor. The light source and sensor are positioned on opposite sides of the disk 36 so that as the rotor 14 and disk 36 rotate relative to assembly 42, the assembly generates a train of timing signals reflecting passage of the slits 38 past assembly 42.

Disk 36 also includes a pair of diametrically opposite radical extensions or paddles 46a and 46b. Each of these paddles is opaque and occupies a 90° sector on the disk perimeter. A set of three optical sensing assemblies 52a, 52b and 52c are positioned adjacent disk 36. These sensing assemblies are similar to sensing assembly 42 except they are targetted on the paddles 46a and 46b rather than on the slits 38. Also the three sensing assemblies are evenly distributed over a 60° sector of the disk. In other words, assemblies 52a and 52c are displaced 30° on opposite sides of assembly 52b. Each assembly produces an output signal only if neither paddle 46a or 46b is positioned opposite that assembly. Thus as the rotor 14 and disk 36 rotate, the three assemblies produce three squarewave position signals, with the pulses in the signals being displaced in phase by an angle of 30°.

Referring again to FIG. 1, motor 10 is driven by a servo system comprising a speed control network 54 which receives the speed signals from sensing assembly 10 and a commutator network 55 which responds to the position signals from sensing assemblies 52a, 52b and 52c in such a way as to drive the motor.

The speed control network 54 includes a differentiator 56 which receives the output signal from the transistor 42b and differentiates that signal to minimize speed errors due to variations in the width of slits 38. The output of the differentiator is applied to a one-shot multivibrator 58 which converts that signal to TTL logic levels, whereupon it is applied to a phase detector 62. Detector 62 compares that signal with a fixed signal from a reference oscillator 64 applied to the detector at TTL logic levels by a one-shot multivibrator 66.

The output of the phase detector is an error signal reflecting the difference in frequency between the signals from sensing assembly 42 and oscillator 64 respectively. The error signal is applied via a low pass filter 64 to a gain and compensation circuit 66 for purposes of stabilizing the servo. Thereupon, the error signal is coupled to a power amplifier 68 which supplies the driving current to stator 12 via commutator network 55. Network 55 switches the drive current between the stator coils to produce a rotating magnetic field in the motor 10 as directed by the position signals from the sensing assemblies 52a to 52c. Network 55 also applies a current sensing signal to power amplifier 68 for current limiting purposes as will be described later.

Referring now to FIG. 4, the illustrated commutation network 55 is designed for motor 10 which is a three phase, four pole, delta wound DC brushless motor as it is a bipolar three phase arrangement. However, the network 55 could, of course, be modified to accommodate other motor configurations. Network 55 comprises three channels indicated at 82, 83 and 84 receiving the outputs of sensing assemblies 52a, 52b and 52c respectively. These channels are all the same so we have illustrated only channel 82 in detail. As shown in that figure, the sensing assembly in each channel comprises a LED 85a connected between ground and, via a resistor 86, a positive voltage source V2. The assembly also includes a phototransistor 85b whose collector is connected to a voltage source V2 and whose emitter is coupled to ground via a resistor 87. The phototransistor 85b is positioned to sense the light emitted by LED 85a when there is no intervening paddle 46a or 46b. The output of the transistor 85b in channel 82 is resistively coupled to a pair of inverters 88 and 89 connected in series. Also, the output of inverter 89 is connected by a resistor 92 back to the input of inverter 88 to provide positive feedback so that the output of inverter 88 is a squarewave signal A that switches between two constant values for every 90° of rotation of disk 36. Signal A is illustrated in FIG. 5A. On the other hand, inverter 89 produces a squarewave signal $\bar{A}$ that is the inverse of signal A. In other words, it is shifted in phase 180° from signal A.

Channel 83 is identical to channel 82 in that it comprises a pair of inverters 88 and 89 which respond to the output of sensing assembly 52b to produce a pair of inverted squarewave signals B and $\bar{B}$, the former being illustrated in FIG. 5B. In the same fashion, channel 84 develops, in response to the output of assembly 52c, a pair of inverted squarewave signals C and $\bar{C}$, the former of which is shown in FIG. 5C. It will be seen from the wave-forms in FIGS. 5A to 5C that the signals A, B and C are displaced in phase 30° from one another as are their inverted counterparts $\bar{A}$, $\bar{B}$ and $\bar{C}$.

Each channel 82, 83 and 84 also includes an AND circuit 94 and a NAND circuit 96. The outputs of the inverters 88 and 89 are applied in six different combinations to the AND and NAND circuits in those three channels to provide the requisite logic signals to drive motor 10. Thus in channel 82, signals A and B are applied to AND circuit 94, while signals $\bar{B}$ and $\bar{A}$ are applied to NAND circuit 96. In channel 83, signals $\bar{A}$ and C are applied to circuit 94, whereas signals $\bar{A}$ and C are coupled to circuit 96. Finally, in channel 34 signals B and C are fed to circuit 94, while signals $\bar{B}$ and $\bar{C}$ are applied to circuit 96 in that channel.

Each channel also includes a pair of identical transistor power switches which receive the outputs of the circuits 94 and 96 respectively in that channel. Thus, channel 82 includes a switch D which receives the output of circuit 94 and a switch D' receiving the output of circuit 96. Likewise, in channel 83 the outputs of the circuits 94 and 96 are applied to switches F and F' respectively. Finally, in channel 84 the outputs of the AND and NAND circuits 94 and 96 are applied to switches E and E' respectively. Since the switches are all identical, we will only describe in detail the switches D and D' in channel 82.

The signal from circuit 94 in channel 82 is inverted by an inverter 102 and applied by way of a resistor 104 to the base of a transistor 106 forming, with a second transistor 108, a Darlington pair having a high input impedance and a relatively low output impedance. The emitter of transistor 108 is connected to the output of power supply 68 and to the base of transistor 106 via a biasing resistor 109. The collectors of the two transistors 106 and 108 are connected to the terminal D of the delta wound stator 12 as illustrated in FIG. 4.

Switch D' includes an inverter 112 which inverts the output from circuit 96 in channel 82 and applies it to the base of a transistor 114 which, along with a second transistor 116, forms a Darlington pair. The output of inverter 112 is also connected via a resistor 118 to the source of positive voltage V2. The collectors of transistors 114 and 116, on the other hand, are applied to stator terminal D, while the transistor 116 emitter is connected to ground by way of a resistor 122 and via a biasing resistor 124 to the base of transistor 114. Finally, stator terminal D is coupled to ground via a diode 124 and to source V1 by a diode 126.

Referring now to FIGS. 1 and 4, in channel 82 when signals A and B are both high, circuit 94 produces an output which is inverted and applied to the Darlington pair 106-108 in switch D causing them to conduct so that power is coupled from power amplifier 68 and its voltage source V1 to terminal D of the stator 12. On the other hand when signals $\overline{A}$ and $\overline{B}$ are high, the output of circuit 96 becomes low so that the output of inverter 112 goes high causing the Darlington pair 114-116 in switch D' to conduct, stator terminal D then being coupled via transistor 116 and resistor 122 to ground.

In much the same fashion, circuits 94 and 96 in channel 83 respond to signals $\overline{A}$ and C and A and $\overline{C}$ respectively to control switches F and F' to alternately connect stator terminal F to power amplifier 68 and ground. Similarly, in channel 84 circuits 94 and 96 respond to signals $\overline{B}$ and $\overline{C}$ and B and C respectively to control switches E and E' to alternately connect stator terminal E to the output of the power amplifier 68 and to ground.

The three channels 82, 83 and 84 operate in concert to produce a rotating magnetic field in stator 12.

FIG. 4 illustrates by arrows 1 to 6 the directions of the currents in the three stator windings during the time intervals T1 through T6 corresponding to one half a revolution of the motor. FIGS. 5A to 5C show the relationships between the position signals A to C produced by sensing assemblies 52a to 52c respectively during time intervals T1 through T6. The position signals $\overline{A}$ to $\overline{C}$, while not shown in those figures, are the inverse counterparts of signals A through C respectively.

FIGS. 5D through 5I illustrate the decoded power switching sequence for switches DEF and D'E'F' assuming counter clockwise rotation of the motor. In other words, those figures show when, during the intervals T1 through T6, the switches DEF and D'E'F' are closed to produce the properly directed currents in the stator 12 as shown in FIG. 4. For example, during time T1 waveform F is high indicating switch F is closed so that drive power is coupled from amplifier 68 (FIG. 1) to terminal F of the stator. During that same time period, waveform D' being high switch D' is closed so that stator terminal D is connected to ground via transistor 116 in channel 82 and resistor 122. Consequently current flows through the stator winding between terminals F and D in the direction indicated by the arrow 1.

During the next time interval T2, it is apparent from FIG. 5G that switch F remains closed so that stator terminal F continues to receive power from amplifier 68. Now however, as shown in FIG. 5E switch E' is closed so that stator terminal E is grounded through that switch and resistor 122. Consequently, current flows between terminals F and E in the direction indicated by arrow 2 in FIG. 4.

The same process continues through time interval T6 with the various switches DEF and D'E'F' switching on and off as indicated by the wave forms. At the end of T6 corresponding to one half a revolution of the motor, the wave forms repeat themselves. Since each time interval T corresponds to 30° of motor rotation, it can be seen from FIGS. 5D to 5I that each switch is closed for approximately 60° during each 180° of rotation of the motor.

Referring now to FIGS. 1 and 4, the drive power supplied by amplifier 68 to the commutator network 55 is modulated in accordance with the speed error signal from the speed control network 54. More particularly, the error signal from the gain and compensation circuit 66 is applied via a resistor 122 to the base of a transistor 124. The emitter of transistor 124 is connected to ground via resistor 126 and by way of a second resistor 128 to the collectors of a pair of transistors 132 and 134 connected as a Darlington pair. The collector of transistor 124 is coupled to the base of transistor 132 by way of a resistor 136 and via a second series resistor 138 to the emitter of transistor 134 which is also connected to the voltage source V1.

If the error signal applied by circuit 66 to the base of transistor 124 decreases indicating motor over speed, that transistor conducts less heavily raising the potential at the base of transistor 132 causing that transistor and its companion transistor 134 to conduct less heavily so that less current is applied via the commutation network 25 to the stator 12 causing the motor to slow down. Conversely, if the speed error signal increases, more power is coupled to the stator windings to compensate and cause the motor to speed up accordingly.

To minimize the chances of damage to the commutator switches D to F and D' to F' and to the power amplifier drive transistors 132 and 134, a current sensing circuit is included which limits the current through those elements. More particularly, the power amplifier 68 includes a transistor 152 whose emitter is connected to ground and whose collector is connected to the base of transistor 124. The base of transistor 152 is connected to ground via a resistor 154 and to the emitters of transistors 116 in each of the switches D', E' and F'. Normally transistor 152 is cut off. However, if the current through the commutator transistors exceeds a selected value, the voltage at the base of transistor 152 increases sufficiently to cause that transistor to conduct. Consequently, the voltage at the base of transistor 124 is prevented from increasing so as to limit the current throught the drive transistors 132 and 134 and the network 55 switches.

Thus as the motor rotor 14 continues to rotate, the positions of the paddles 46a and 46b relative to the sensing assemblies 52a to 52c control the commutator network 55 so that the drive power from the power amplifier 68 is coupled to the stator 12 windings so as to generate a rotating magnetic field that rotates the rotor 14. Since the motor runs on DC power, the speed of the motor is not frequency dependent. Also since the commutator network 55 is used in lieu of brushes, the motor is characterized by low noise and cost and infrequent maintenance. Close control over the speed of the rotor 14 is achieved through the use of the speed control network 54 that responds to the signals generated from the timing disk 36 to regulate the amount of drive current applied to the motor windings.

Finally, the drive motor is quite stable over the long and short terms because of its inside out design enabling the centrally located stator to be directly mounted to the machine chassis which immediately conducts away any heat developed in the motor before it can adversely effect the motor. The aforesaid inside out motor design also has an attendant cost saving in that the motor rotor can use the same bearings as the disk-driving spindle to preserve its co-linearity with the stator.

It will be seen from the foregoing, then, that the objects set forth above among those made apparent from the preceding description are efficiently attained, and since certain changes made be made in the above construction without departing from the scope of the invention, it is intended that all matter contained in the above description or shown in the accompanying drawings be interpreted as illustrative and not in a limiting sense.

It will also be understood that the following claims are intended to cover all of the generic and specific features of the invention herein described.

We claim:
1. A disk drive system comprising
   A. a chassis,
   B. a generally cylindrical brushless DC motor stator secured to the chassis,
   C. a tubular brushless DC motor rotor, said rotor having an inside diameter slightly greater than the diameter of the stator,
   D. a spindle secured to one end of the rotor co-axially with the rotor,
   E. means for rotatively supporting the spindle from the chassis so that the rotor envelops the stator and is co-axial therewith, and
   F. means for controlling the speed of said motor, said controlling means including
      (1) means extending around the perimeter of the rotor defining a timing track,
      (2) sensing means positioned adjacent the timing track for producing an electrical signal indicating the angular speed of the rotor relative to the sensing means,
      (3) means for generating a speed reference signal,
      (4) means for comparing said speed signal and said reference signal to develop an error signal indicating the deviation of the rotor speed from the reference speed, and
      (5) means responsive to the error signal for controlling the current to said stator so as to regulate the speed of the rotor to minimize said error signal.

2. The system defined in claim 1 wherein the current controlling means includes
   A. a set of switches,
   B. means for producing a set of electrical signals indicating the instantaneous angular position of the rotor, and
   C. means for applying the set of signals to the set of switches so as to provide electrical currents to the stator that produce a rotating magnetic field therein.

3. The system defined in claim 2 wherein the signal set producing means comprises
   A. means extending at least part way around the perimeter of the rotor defining one or more selected sectors of the rotor cross-section and,
   B. a set of position sensors positioned adjacent the sector defining means, said position sensors being spaced apart angularly from one another around the axis of the rotor and producing said position indicating signals, each said position indicating signal reflecting the presence or absence of the sector defining means opposite the sensor producing that signal.

4. The system defined in claim 3 wherein
   A. the timing track defining means comprises an annulus secured to the perimeter of the rotor, said annulus being opaque except for a circular array of radially oriented, light transmitting slits uniformly distributed around the annulus, and
   B. the sector defining means comprises one or more radial extensions on the annulus, all of said extensions having the same angular extent about the annulus and being uniformly spaced apart from one another about the annulus.

5. The system defined in claim 4 wherein the speed sensing means and position sensors each comprise
   A. a light source positioned on one side of the annulus, and
   B. a light sensor positioned opposite each light source on the opposite side of the annulus from said source, the line of sight between the light source and light sensor comprising the speed sensing means interrupting the slit array, and the line of sight between the light source and light sensor comprising each position sensor interrupting the radial extensions.

* * * * *